C. E. RAYMOND.
GEARING.
APPLICATION FILED APR. 4, 1911.

1,033,468.

Patented July 23, 1912.

Witnesses.
Franklin E. Low.
Sydney E. Taft.

Inventor:
Charles E. Raymond
by his attorney
Charles N. Goodwin.

UNITED STATES PATENT OFFICE.

CHARLES E. RAYMOND, OF BOSTON, MASSACHUSETTS.

GEARING.

1,033,468.  Specification of Letters Patent.  Patented July 23, 1912.

Application filed April 4, 1911. Serial No. 618,799.

*To all whom it may concern:*

Be it known that I, CHARLES E. RAYMOND, a citizen of the United States, residing at Boston, in the county of Suffolk and State of Massachusetts, have invented new and useful Improvements in Gearing, of which the following is a specification.

This invention relates to improvements in gearing, and its object is to eliminate the usual noise due to backlash between the teeth of intermeshing gears.

In all kinds of gearing in which there is any backlash whatsoever, whether in spur gears, bevel gears, or in sprocket wheels and chains the backlash or play between the teeth at the pitch line, however slight, produces more or less noise which is unpleasant, and the purpose of this invention is to provide gears of this class with means for preventing such noise.

The invention consists in the novel features of construction and in the combination and arrangement of parts set forth in the following specification and particularly pointed out in the claims.

Figure 1:
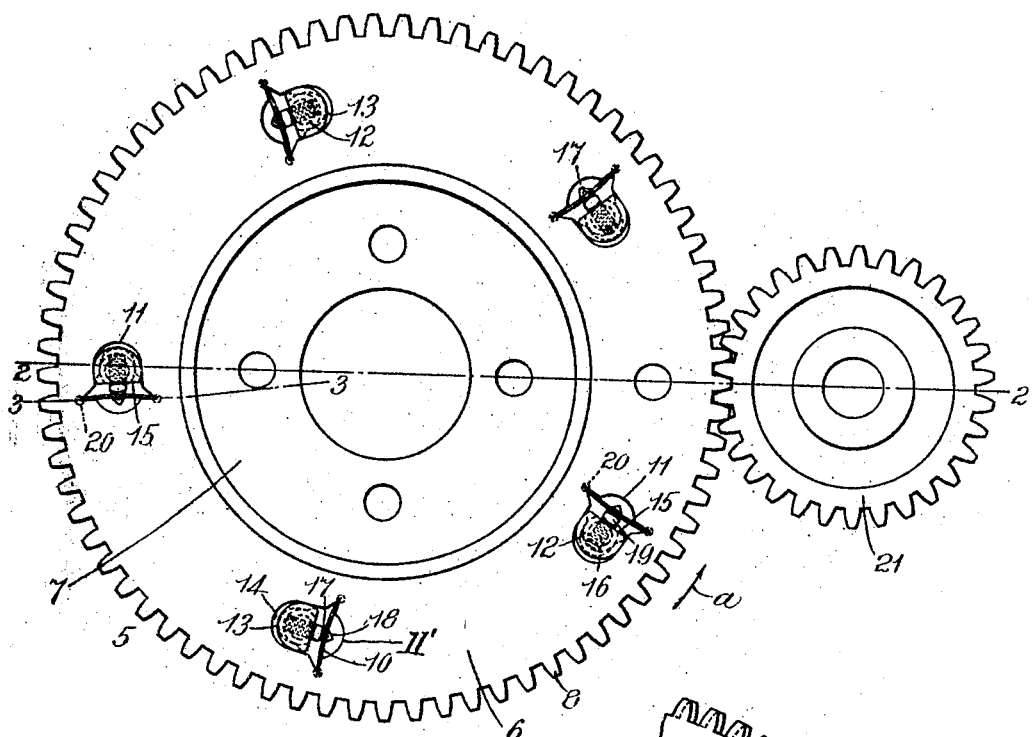
Figure 3:
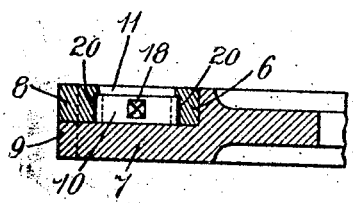
Figure 4:
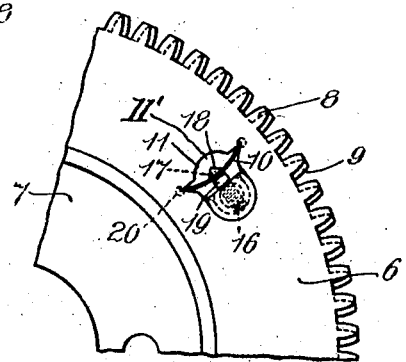
Figure 2:
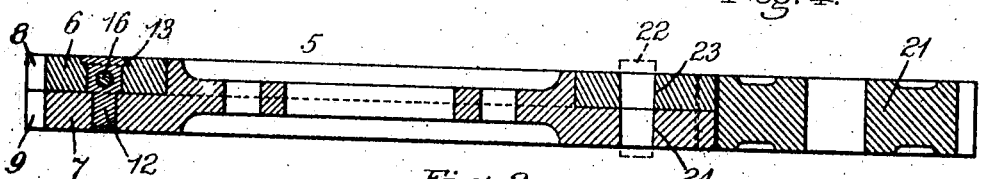

Referring to the drawings: Figure 1 is an elevation of a pair of intermeshing gears embodying my invention. Fig. 2 is a sectional view taken on line 2—2 of Fig. 1.
Fig. 3 is a detail sectional view taken on line 3—3 of Fig. 1. Fig. 4 is a detail elevation of a portion of the two-part gear showing the two parts in the position which they occupy when the teeth are out of mesh with the other gear.

Like numerals refer to like parts throughout the several views of the drawings.

In the drawings, the numeral 5 designates generally a gear comprising two coaxially arranged parts 6 and 7 rotatably mounted with respect to each other and preferably the part 6 consists of a ring journaled upon the part 7. The part 6 is provided with a set of suitable teeth 8 and the part 7 is provided with an identical set of teeth 9, these teeth, in practice, being cut on both parts at the same time by fastening the two parts to each other in any suitable manner. While this is the case with cut gears, it is, of course, not the case with gears having cast teeth. The two parts of the gear 5 are connected to each other by elastic yielding means urging the teeth of said parts in opposite directions circumferentially with respect to each other, said means preferably consisting of one or more springs 10 of any suitable construction carried by one of the parts and engaged by one or more elements carried by the other part. In the present instance, the springs 10 are somewhat bow-shaped, as will be evident from an inspection of Figs. 1 and 4, and are located in slots 11 provided in the ring 6, said slots are concentrically arranged relatively to the axis of said gear and are counterbored a portion of their length, said counterbored portion and said slot terminating in holes 11', which are equal in diameter to said counterbored portions. Studs 12 secured to the part 7 of said gears are provided with heads 13 substantially equal in diameter to the holes 11', into which they are placed, and the ring 6 rotated until said heads 13 engage the shoulders 14 of said slots which are formed by said counterbore and which lock said gears against lateral movement relatively to each other. For the sake of economizing space, the studs 12 may be provided with flat faces 15.

Screws 16 having screw-threaded engagement with the studs 12, respectively, engage the springs 10, respectively, and preferably, said screws are provided with pyramidal ends 17 located in corresponding pyramidal depressions 18 provided in the springs 10, respectively, thus providing a means whereby the screws are held against accidental turning due to vibration and other causes and yet may be rotated to vary the tension of the springs 10 simply by applying sufficient force to the screws to free the corners of the pyramidal ends of the screws from the corresponding corners of the pyramidal depressions in which they are normally located. For the purpose of adjusting the screws 16, the same may be provided with squared portions 19 to which a suitable wrench may be applied.

Preferably the extremities of each of the springs 10 are seated in pockets 20 formed by drilling the metal of the ring 6 part way through from the inner toward the outer face, but terminating short of the outer face, as will be evident from an inspection of Fig. 3. These pockets provide room for the springs to flatten when sufficient force is applied thereto and also prevent the springs from coming out of place accidentally, it being evident that the ring 6 must be removed in order to permit the removal of the springs. The screws 16 also form an additional means for preventing the springs from becoming accidentally displaced.

The gear 5 may mesh with any suitable element to drive or be driven, such, for example, as a rack or gear, the latter being shown in the drawings and designated by the numeral 21. It will be understood, however, that by properly shaping the teeth of the gear 5 the same may be adapted to mesh with a chain and my invention is not limited to the precise construction shown. In making up the gear 5, the two parts 6 and 7 will, in practice, be pinned together by a pin 22, shown in dotted lines in Fig. 2, driven through a hole 23 provided in the part 6 and a hole 24 provided in the part 7, this pin serving to cause the teeth 8 and 9 to register with each other until the teeth of the gear 21 have been placed in mesh therewith, after which the pin 22 may be driven out. It will now be evident that the springs 10 urge the teeth 8 and 9 of the parts 6 and 7, respectively, against opposite flanks of the teeth of the gear 21 and accordingly, the spaces between the teeth of the gear 21 at the pitch line will be entirely filled by the teeth of the two-part gear 5 and there can be no backlash whatever. The tendency of the springs 10 to rotate the two parts 6 and 7 in opposite directions with respect to each other is illustrated in Fig. 4, which shows the relative positions occupied by the teeth when the gear 21 is withdrawn from mesh therewith.

While gears constructed as herein shown and described may be utilized for a variety of purposes, they are particularly intended and adapted to be used in places where noise is undesirable, and where space is limited as in automobile timing gears. It is, of course, well known that gears when carefully cut and when new make but little noise because there is but little backlash, but when the gears are run at high speed and especially when they become worn so that considerable backlash exists, they become objectionably noisy and it will be evident that such noise may be obviated by the use of gearing constructed in accordance with my invention.

Having thus described my invention, what I claim and desire by Letters Patent to secure is:

1. A toothed gear having, in combination, two coaxially arranged parts each having a set of teeth around its periphery, a stud secured in one of said parts and provided with a head, the other of said parts having a slot therein concentrically arranged relatively to the axis of said part, one end of said slot terminating in a hole substantially equal in diameter to the head of said stud and the other end of said slot having a shoulder adapted to engage the under side of said head whereby said gear parts may be placed together and locked against lateral movement relatively to each other, a flat spring located in said slot and provided with a depression, and a screw having screw-threaded engagement with said stud and having one end located in said depression.

2. A toothed gear having, in combination, two coaxially arranged parts each having a set of teeth around its periphery, one of said parts consisting of a ring journaled upon the other of said parts, and having a slot therein concentrically arranged relatively to the axis of said gear, a stud secured in the other of said parts provided with a head and adapted to engage said slot, a flat spring located in said slot and provided with a pyramidal depression, and a screw having screw-threaded engagement with said stud and provided with a pyramidal shaped end adapted to engage the corresponding depression in said spring.

In testimony whereof I have hereunto set my hand in presence of two subscribing witnesses.

CHARLES E. RAYMOND.

Witnesses:
  LOUIS A. JONES,
  ALVIN H. EMERY.